(12) United States Patent
Shores et al.

(10) Patent No.: US 6,361,031 B1
(45) Date of Patent: Mar. 26, 2002

(54) ADAPTIVE HYDRAULIC ENGINE MOUNT

(75) Inventors: Jay Michael Shores, Miamisburg; Sanjiv Gobind Tewani, Lebanon; Thomas Allen Baudendistel, Farmersville; Mark Wayne Long, Bellbrook; James Eugene Dingle, Cincinnati, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/513,123

(22) Filed: Feb. 25, 2000

(51) Int. Cl.⁷ .................................................. F16F 5/00
(52) U.S. Cl. .................... 267/140.14; 267/219
(58) Field of Search ........................... 267/219, 140.11, 267/140.13, 140.14, 140.15

(56) References Cited

U.S. PATENT DOCUMENTS

| | | | |
|---|---|---|---|
| 4,712,777 A | * 12/1987 | Miller | 267/140.1 |
| 4,802,648 A | * 2/1989 | Decker et al. | 248/550 |
| 4,886,252 A | * 12/1989 | Haussermann | 267/140.1 |
| 5,205,546 A | 4/1993 | Schisler et al. | |
| 5,246,212 A | * 9/1993 | Funhashi et al. | 267/140.13 |
| 6,017,024 A | * 1/2000 | Muramatsu et al. | 267/140.14 |
| 6,036,183 A | * 3/2000 | Lee et al. | 267/140.14 |
| 6,082,718 A | * 7/2000 | Yamada et al. | 267/140.14 |

* cited by examiner

*Primary Examiner*—Robert J. Oberleitner
*Assistant Examiner*—Bradley King
(74) *Attorney, Agent, or Firm*—Scott A. McBain

(57) ABSTRACT

An adaptive hydraulic engine mount for mounting an engine to a frame of a motor vehicle includes a pumping chamber and reservoir filled with damping fluid and an orifice track or damping channel communicating the pumping chamber with the reservoir. A decoupling diaphragm responds to pressure level in a control cavity to control pumping of damping fluid through the damping channel, thereby controlling the dynamic stiffness of the mount. Upon actuation of a control valve, the pressure level in the control cavity is changed to achieve a level of damping greater than the low damping level. According to another embodiment of the invention, the control cavity can be communicated with engine vacuum to achieve maximum damping, or air may be trapped in the control cavity to achieve an intermediate level of damping, or the control cavity may be communicated to atmosphere to provide low levels of damping.

3 Claims, 2 Drawing Sheets

ADAPTIVE HYDRAULIC ENGINE MOUNT

TECHNICAL FIELD

This invention relates to an adaptive engine mount for mounting the engine of a motor vehicle onto the vehicle frame in which the damping characteristics of the engine mount may be changed by operation of an electrically or vacuum actuated control valve.

BACKGROUND OF THE INVENTION

The dynamic characteristics of a motor vehicle are such that while driving on a smooth road at highway speeds the vehicle may shake and vibrate unless engine mounts having high dynamic stiffness and damping are used to mount the engine on the frame. On the other hand, the engine mounts are required to provide good isolation of the engine during engine idle conditions, which requires a very soft engine mount that has low dynamic stiffness. Accordingly, compromises must be made. As a result, engine mounts are typically designed in which damping is low during low vibratory inputs and in which higher damping and resulting stiffness is provided during higher vibratory input conditions.

However, vehicle operating conditions exist when the higher dynamic stiffness and damping are desirable even though the vibratory inputs may be relatively small. Accordingly, it has been disclosed in U.S. Pat. No. 5,205,546 to provide a solenoid actuator in a dynamic engine mount which can switch the mount to the higher stiffness mode at any driving condition.

SUMMARY OF THE INVENTION

The present invention provides a dynamic engine mount in which stiffness and damping can be changed to accommodate varying driving conditions This is achieved by providing a control cavity in the fixed wall separating the pumping chamber and reservoir of a conventional engine mount. The wall includes an orifice track through which fluid is pumped to achieve the higher stiffness and damping. A decoupling diaphragm is mounted in the wall, one side of which is exposed to the fluid in the pumping chamber, and the other side of which is exposed to the pressure level in the control cavity. During normal operation, the control cavity is vented to atmosphere, and the mount functions as a typical hydraulic mount; that is, the mount provides low dynamic stiffness and damping for small vibratory inputs and higher dynamic stiffness and damping for larger vibratory inputs. However, a solenoid actuator may by actuated for any vibratory input to trap air in the control cavity, which acts as an air spring resisting movement of the decoupling diaphragm, thereby increasing damping for any vibratory input.

DESCRIPTION OF THE PREFERRED EMBODIMENT

Figure 1:
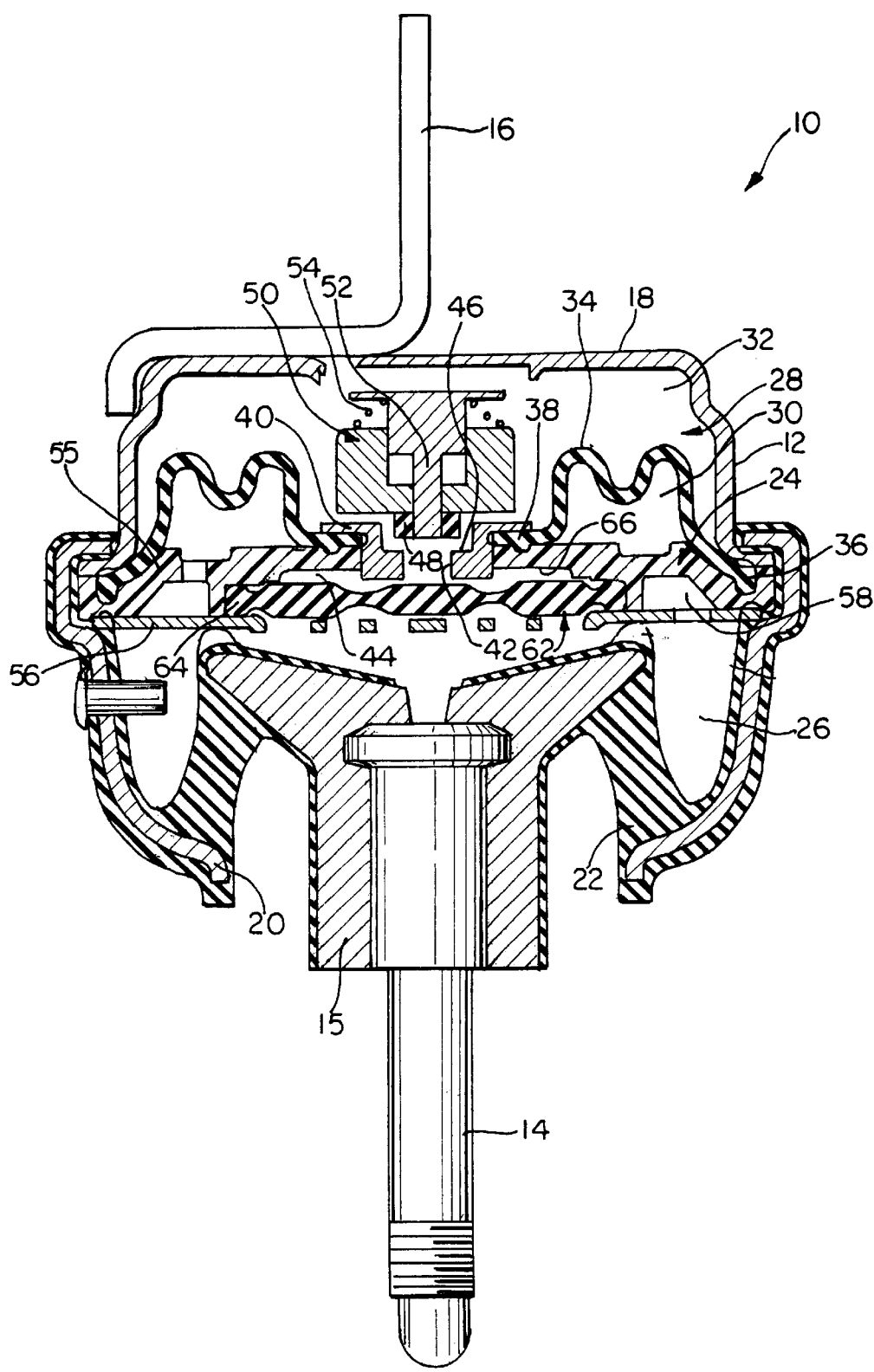
FIG. 1 is a cross-sectional view taken through an engine mount made pursuant to the teachings of the present invention.

Referring now to FIG. 1, an engine mount incorporating the present invention is generally indicated by the numeral 10. The engine mount 10 includes a housing 12 which incorporates a stud 14 and a bracket 16 for securing the mount 10 to the frame and engine of the vehicle wherein the mount 10 secures the engine to the frame. An insert 15 is mounted on the stud 14.

The housing 12 includes an upper section 18 from which the bracket 16 extends and a lower section 20. The lower section 20 includes an elastomeric insert 22 made out of an elastomeric material (such as rubber) in which the stud 14 and insert 15 are embedded. Clamped between the sections 18 and 20 is a fixed wall 24 which divides the volume defined by the housing 12 into a pumping chamber 26 and an upper chamber 28. The upper chamber 28 is divided into a reservoir 30 and an atmospheric section 32 (which is vented to atmosphere) by a flexible diaphragm 34. The flexible diaphragm includes an outer circumferentially extending edge portion 36 which is sealingly clamped between the housing section 18 and the wall 24 and an inner circumferentially extending edge 38 that is clamped against the upper surface of the wall 24 by an insert 40. The insert 40 defines a passage 42 communicating the atmospheric section 32 through wall 24 and into a control cavity 44 defined on the side of the wall 24 facing the pumping chamber 26.

A valve seat 46 circumscribes the passage 42. The valve seat 46 cooperates with a sealing element 48 mounted on a plunger 52 of a solenoid valve 50 mounted in the atmospheric section 32. The solenoid valve 50 includes a solenoid actuator for moving the valve sealing element 48 toward and away from the seat 46 and a spring 54 which yieldably urges the plunger and sealing element 48 away from the seat 46. Accordingly, the valve seat 46 is normally open to permit communication between the atmospheric section 32 and the control cavity 44. However, upon energization of the solenoid actuator, the sealing element 48 is moved into sealing engagement with the valve seat 46 to thereby trap air in the control cavity 44. Although a solenoid actuated valve is shown, it is well known to those skilled in the art that vacuum actuated valves may also by used to control communication with the control cavity 44. Such valves may respond to predetermined engine operating conditions to actuate the sealing element in response to engine vacuum.

The wall 24 includes an upper plate 55 which is clamped against a lower plate 56. A damping channel or orifice track 58 is defined by an annular groove in the upper plate 55 which is closed by the lower plate 56. The size and length of the orifice track 58 is carefully chosen to respond to predetermined vibratory conditions. For example, at a predetermined frequency of vibration, fluid pumping through the orifice track 58 is initiated, thereby causing damping fluid to be pumped from the pumping chamber 26 into the reservoir through the damping channel or orifice track 58, thereby changing the damping and dynamic stiffness of the mount to control the vibratory inputs.

A decoupler including the control cavity 44, the solenoid valve 50, and a pressure responsive member or decoupling diaphragm 62 is provided to enable the damping characteristics of the engine mount 10 to be controlled as will be hereinafter explained. Decoupling diaphragm 62 extends across the open side of the control cavity 44 and is provided with a circumferentially extending bead 64 which is clamped between the plates 55 and 56 to provide sealing to prevent fluid in the pumping chamber 26 from entering the control cavity 44. The decoupling diaphragm 62 is otherwise free to deflect into the cavity 44.

In operation, the engine mount 10 is illustrated in FIG. 1 with the solenoid valve 50 turned off. In this condition, communication between the control cavity 44 and the atmospheric section 32 is permitted and the engine mount 10 functions as a typical prior art engine mount. Accordingly the decoupling diaphragm 62 is free to move within the cavity 44. The decoupling diaphragm 62 vibrates in response to vibrations below a predetermined amplitude, thereby absorbing the energy applied to the damping fluid and preventing the damping fluid from communicating through the orifice track or damping channel 58. As a result, the engine mount exhibits low dynamic stiffness at low vibratory inputs, and all damping is due to the damping provided by the elastomeric insert 22. At the predetermined vibratory amplitude, the decoupling diaphragm 62 seats against the bottom surface 66 of the cavity 44 defined on the upper plate 55. Accordingly, the decoupling diaphragm 62 ceases to move in response to vibratory inputs to the damping fluid, and the damping fluid begins to be pumped through the damping channel or orifice track 58 into the reservoir 30. Accordingly, the dynamic stiffness of the engine mount 10 is increased. As a result, the engine mount 10 exhibits low dynamic stiffness that is related only to the stiffness of the inserts 22 at low inputs to the mount, and exhibits increased dynamic stiffness and damping at higher frequency inputs to the mount.

According to the invention, the dynamic stiffness of the engine mount 10 can be at changed to a higher dynamic stiffness at any engine or driving condition by operation of the solenoid valve 50. When the solenoid valve 50 is actuated, air is trapped within the control cavity 44, and the decoupling diaphragm 62 is not able to move easily within the control cavity 44. As a result, the damping fluid is forced to flow through the orifice track or damping channel 58, thereby increasing dynamic stiffness and damping of the engine mount 10 almost instantaneously upon activating the solenoid valve 50. The decoupling diaphragm 62 and control cavity 44 may be designed such that the vibratory inputs required to initiate pumping of damping fluid through the orifice track or damping channel 58 may be the same or less than the vibratory inputs required to seat the decoupling diaphragm against the surface 66 of the control cavity 44 when the control cavity 44 is communicated to the atmospheric section 32.

Figure 2:
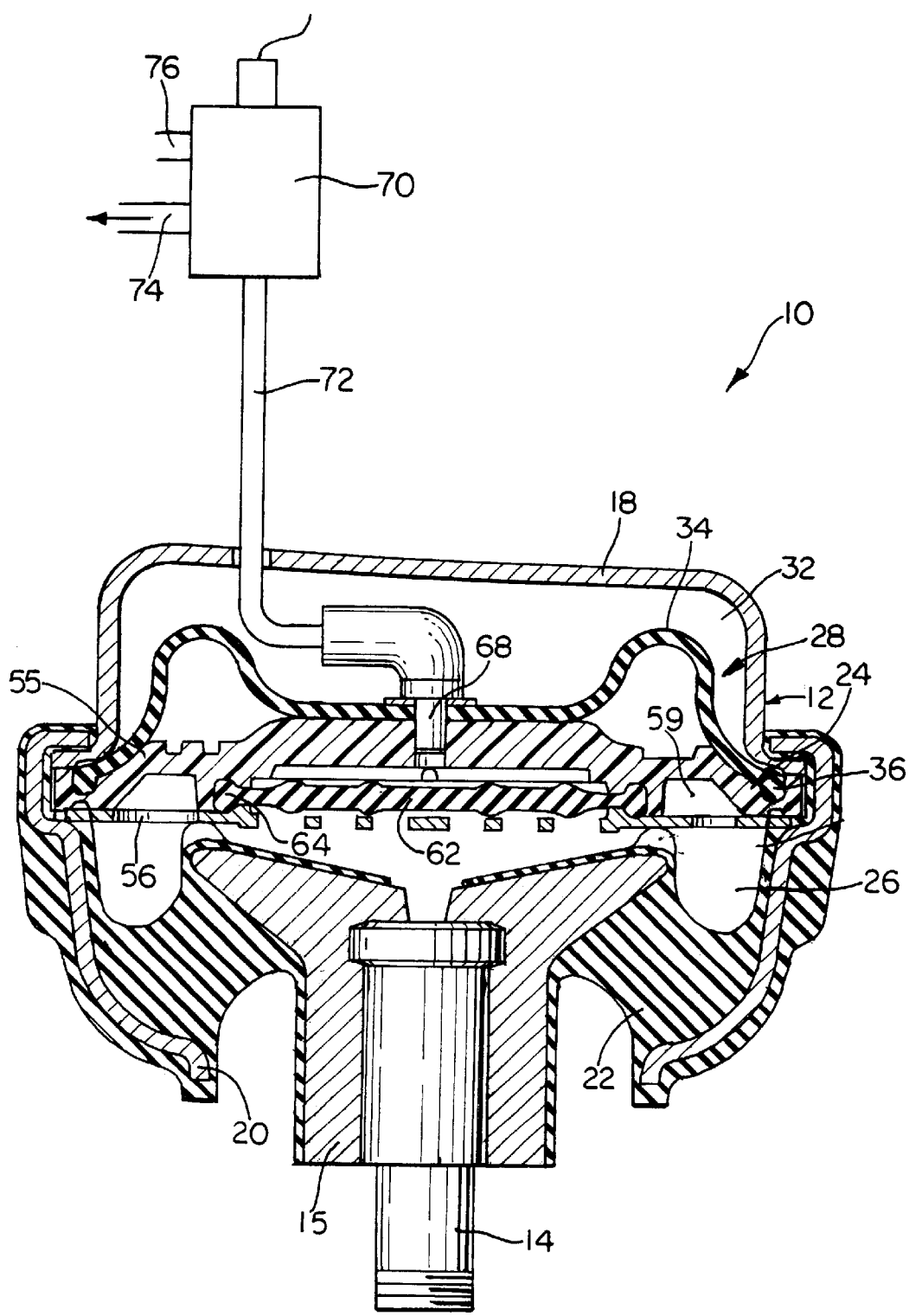
FIG. 2 is a view similar to FIG. 1, but illustrating another embodiment of the invention.

Referring now to the embodiment of FIG. 2, elements the same or substantially the same as those of the embodiment of FIG. 1 retain the same reference character. In FIG. 2, the solenoid valve 50 and insert 40 of FIG. 1 are a replaced by a fitting 68 which extends through the flexible diaphragm 34 and upper plate 55 to communicate the control chamber 44 to a three-way solenoid valve 70 through a conduit 72. The solenoid valve 70 is switchable between positions closing off the conduit 72, communicating the conduit 72 to an atmospheric vent 74, and communicating the conduit 72 to an engine vacuum port 76. When the solenoid valve 70 communicates the conduit 72 to atmosphere, the mount 10 operates as described above; that is, during low vibratory inputs the decoupling diaphragm 62 vibrates and fluid is not pumped through the orifice track or damping channel 58, so that the only damping is provided by the elastomeric insert 22; at higher vibratory inputs, the decoupling diaphragm seats against the surface 66 so that fluid is pumped through the orifice track or damping channel 58 to achieve maximum dynamic stiffness. However, maximum dynamic stiffness can be attained in any operating condition by operation of the three-way solenoid valve 70 to communicate the conduit 72 to engine vacuum. When this occurs, a vacuum is drawn in control cavity 44, thereby forcing the decoupling diaphragm 62 to seat against the a surface 66, thereby attaining maximum dynamic stiffness. If an intermediate damping level is desired, the three-way solenoid valve 70 closes off the conduit 72, thereby trapping air in the control cavity 44. This pressure in cavity 44 acts as an air spring, and the decoupling diaphragm and cavity 44 are designed such that the resistance to the deflection of the decoupling diaphragm 62 is greater than that provided when the cavity 44 is communicated to atmosphere, but less than that provided when the decoupling diaphragm 58 is seated against the surface 66. The resulting deflection of the decoupling diaphragm 62 causes some of the fluid to flow through the damping channel or orifice track 58 to provide a moderate level of damping.

What is claimed is:

1. Adaptive hydraulic engine mount for mounting an engine on a vehicle frame comprising a housing defining a chamber therewithin, said housing including an elastomeric element for controlling engine vibrations, a pumping chamber and a reservoir defined within said housing, said pumping chamber and said reservoir being filled with damping fluid, a damping channel communicating the pumping chamber with the reservoir and permitting fluid to communicate between the pumping chamber and the reservoir during predetermined engine vibratory conditions to effect damping, a decoupler for coupling and decoupling communication between said pumping chamber and said reservoir through said damping channel, said decoupler including a control cavity, a pressure responsive member responsive to pressure in said control cavity, and a selectively operable control valve for controlling communication with the control cavity, said pressure responsive member responding to the control cavity to change the engine vibratory conditions at which coupling and decoupling occurs, said control valve being operable from a first condition communicating said control cavity to atmosphere and a second condition closing communication with said cavity, and a flexible diaphragm separating said reservoir from an atmospheric chamber defined within said housing, said control valve controlling communication between said control cavity and said atmospheric chamber.

2. Adaptive hydraulic engine mount for mounting an engine on a vehicle frame comprising a housing defining a chamber therewithin, said housing including an elastomeric element for controlling engine vibrations, a pumping chamber and a reservoir defined within said housing, said pumping chamber and said reservoir being filled with damping fluid, a damping channel communicating the pumping chamber with the reservoir and permitting fluid to communicate between the pumping chamber and the reservoir during predetermined engine vibratory conditions to effect damping, a decoupler for coupling and decoupling communication between said pumping chamber and said reservoir through said damping channel, said decoupler including a control cavity, a pressure responsive member responsive to pressure in said control cavity, and a selectively operable control valve for controlling communication with the control cavity, said pressure responsive member responding to the control cavity to change the engine vibratory conditions at which coupling and decoupling occurs, said control valve being operable from a first condition communicating said control cavity to atmosphere and a second condition closing communication between said cavity and atmosphere to trap a volume of air in said control cavity;

said pressure responsive member being a decoupling diaphragm having opposite sides, one side of said decoupling diaphragm being acted upon by the pressure level in said pumping chamber, the other side of said decoupling diaphragm being exposed to the fluid pressure level in said control cavity;

said control cavity being defined within a wall extending across said chamber and separating the pumping chamber from the reservoir, said damping channel extending through said wall, said decoupling diaphragm being mounted on said wall, said control cavity being defined within said wall and being separated from said pumping chamber by said decoupling diaphragm;

a flexible diaphragm cooperating with one side of said wall to separate said reservoir from an atmospheric chamber defined within said housing, and a passage extending through said diaphragm and into said control cavity, said control valve controlling communication through said passage;

wherein said control valve in said first condition communicates said passage to said atmospheric chamber and in said second condition closes communication through said passage.

3. Adaptive hydraulic engine mount for mounting an engine on a vehicle frame comprising a housing defining a chamber therewithin, said housing including an elastomeric element for controlling engine vibrations, a fixed wall within said chamber dividing said chamber into a fluid filled pumping chamber and a secondary chamber, a flexible diaphragm dividing said secondary chamber between a fluid filled reservoir defined between the diaphragm and the fixed wall and an atmospheric chamber communicated to atmospheric pressure, a damping channel defined within said fixed wall and communicating the pumping chamber with the reservoir and permitting fluid to communicate between the pumping chamber and the reservoir during predetermined vibratory conditions to effect damping, and a decoupler for coupling and decoupling said pumping chamber and said reservoir through said damping channel, said decoupler including a control cavity, a pressure responsive member responsive to pressure in said control cavity, and a selectively operable control valve operable from a first condition communicating said control cavity with atmosphere and a second condition closing off said control cavity, said decoupler responding to the pressure level in said control cavity to change the engine vibratory conditions at which coupling and decoupling occurs, wherein said control valve in said first condition communicates said control cavity with said atmospheric chamber.

\* \* \* \* \*